US012711021B2

(12) United States Patent
Ding et al.

(10) Patent No.: US 12,711,021 B2
(45) Date of Patent: Aug. 18, 2026

(54) DISASTER RECOVERY TECHNIQUES

(71) Applicant: Rubrik, Inc., Palo Alto, CA (US)

(72) Inventors: Li Ding, Cupertino, CA (US); Jun Ma, Sunnyvale, CA (US); Derrin Thomas Rummelt, Grand Rapids, MI (US); Hao Zhou, Mountain View, CA (US)

(73) Assignee: Rubrik, Inc., Palo Alto, CA (US)

(*) Notice: Subject to any disclaimer, the term of this patent is extended or adjusted under 35 U.S.C. 154(b) by 594 days.

(21) Appl. No.: 18/098,058

(22) Filed: Jan. 17, 2023

(65) Prior Publication Data

US 2024/0241795 A1 Jul. 18, 2024

(51) Int. Cl.

| | |
|---|---|
| ***G06F 11/1446*** | (2026.01) |
| ***G06F 9/455*** | (2018.01) |
| ***G06F 16/11*** | (2019.01) |

(52) U.S. Cl.

CPC ...... *G06F 11/1469* (2013.01); *G06F 9/45558* (2013.01); *G06F 11/1446* (2013.01); *G06F 11/1458* (2013.01); *G06F 16/122* (2019.01); *G06F 16/128* (2019.01); *G06F 2009/4557* (2013.01); *G06F 2009/45595* (2013.01); *G06F 2201/84* (2013.01)

(58) Field of Classification Search

None

See application file for complete search history.

(56) References Cited

U.S. PATENT DOCUMENTS

| | | | | |
|---|---|---|---|---|
| 9,405,630 B2 * | 8/2016 | Duggan | .............. | G06F 11/2048 |
| 2016/0077919 A1 * | 3/2016 | Duggan | .............. | G06F 11/2023 714/15 |
| 2020/0235993 A1 * | 7/2020 | Shpilyuck | ........... | G06F 11/1469 |

* cited by examiner

*Primary Examiner* — Qing Yuan Wu

(74) *Attorney, Agent, or Firm* — Holland & Hart LLP

(57) ABSTRACT

Methods, systems, and devices for data management are described. A data management system (DMS) may facilitate multi-layer data structure recovery. For example, the DMS may receive a request to recover a data structure backed up by the DMS to a destination environment. The data structure may include virtual machines that are organized according to a first topology that includes multiple logical layers. In response to the request, the DMS may determine the first topology using metadata associated with the structure and determine destination resources of the destination environment to which to recover the virtual machines. The destination resources may be organized according to a second topology that is the same as or based on the first topology and that includes multiple logical layers, and the DMS may recover the virtual machines to the destination environment.

21 Claims, 11 Drawing Sheets

DISASTER RECOVERY TECHNIQUES

FIELD OF TECHNOLOGY

The present disclosure relates generally to data management, including techniques for disaster recovery techniques.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
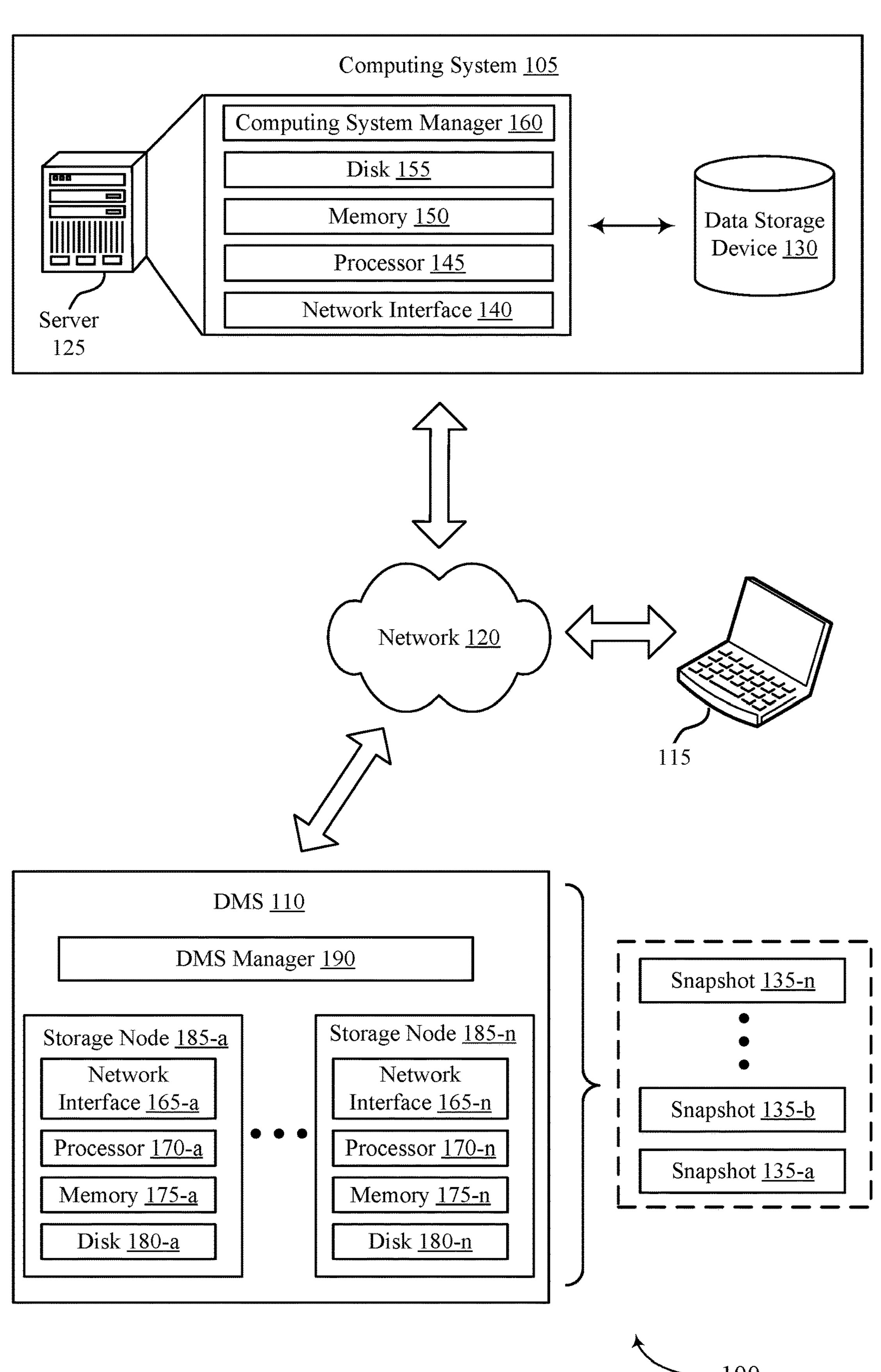
FIGS. 1 and 2 illustrate examples of computing environments that support disaster recovery techniques in accordance with aspects of the present disclosure.

A data management system (DMS) may provide backup and recovery services to a computing system. For example, the DMS may backup and recover virtual machines of the computing system, such as by facilitating the capture (e.g., generation, ingestion) and storage of snapshots of the virtual machines, and the snapshots may support later recovery (e.g., restoration) of corresponding virtual machines. The DMS may recover backed up virtual machines to a destination environment, for example, in the event of a disaster, such as a natural disaster at or near a location of the computing system, a power outage associated with the computing system, a brownout associated with the computing system, or a ransomware or malware attack associated with the computing system, among other scenarios in which a user of the computing system may request the DMS to recover the virtual machines to the destination environment.

In some examples, the DMS may recover virtual machines on a per-virtual machines level of granularity, as selected by the user. A user may desire to recover the virtual machines of a given data structure (e.g., a VMWare vCenter, a VMWare vSphere object, a compute cluster, a datacenter, a hypervisor, a host, a resource pool, among others). Here, the user may manually select the virtual machines that are associated with (e.g., belong to, are included in) the specific data structure among a set of discovered virtual machines associated with the user that are backed up by the DMS (e.g., a set of virtual machines including the virtual machines belonging to the specific data structure, virtual machines belonging to other data structures, or any combination thereof). Manual selection of virtual machines for recovery by the user may be time-consuming and error prone, especially as the quantity of virtual machines backed up the DMS increases. Additionally, the data structure may be organized into various logical layers, but these logical layers may be absent from the recovery workflow (e.g., may not be evident or visible as part of the virtual machine selection) with visibility instead being individual virtual machines for selection and recovery. As a result, a likelihood that virtual machines are incorrectly recovered to the destination environment may increase.

In accordance with examples as described herein, the DMS may implement automatic data structure recovery that reduces or eliminates the possibility of user error and maintains virtual machine organization and layer structure during recovery. For example, as part of backing up a data structure (e.g., capturing snapshots of virtual machines included in the data structure), the DMS may capture metadata that includes hierarchical information of the data structure, such as a topology (e.g., infrastructure, organization) of the data structure and the various logical layers according to which the virtual machines (e.g., and other entities, such as hosts, compute clusters, resource pools, and so on) are organized. The DMS may use this metadata to rebuild the topology of the data structure in association with recovery of the virtual machines to a destination environment. That is, the DMS may use the metadata to select the virtual machines associated with the data structure from the virtual machines backed up by the DMS, determine how the virtual machines of the data structure are organized within a source environment (e.g., a computing system backed up by the DMS), and determine how the virtual machines may be recovered to the destination environment to maintain the same (e.g., or similar) organization.

For example, the DMS may use the metadata to determine destination resources of the destination environment to which to recover the virtual machines of the data structure, the destination resources having a topology that is the same as or based on the topology of the data structure. In some examples, the DMS may present the proposed recovery to the user (e.g., via a user interface), and the user may adjust the proposed recovery (e.g., deselect one or more virtual machines for recovery, modify one or more destination resources for recovery) and/or approve the recovery. The DMS may recover the virtual machines to destination resources of the destination environment. In this way, manual virtual machine selection by the user for recovery may be avoided in association with recovering the data structure and may be replaced with automatic selection by the DMS, thereby reducing recovery errors and saving the user time, among other benefits.

FIG. 1 illustrates an example of a computing environment 100 that supports disaster recovery techniques in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160) may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

The DMS 110 may support the restoration of computing objects (e.g., data structures) that include multiple logical layers of management entities (e.g., software entities) and virtual machines, as described with reference to FIG. 3. In some examples, the computing system 105 may be an example of a source environment (e.g., primary environment) or a destination environment (e.g., target environment) to which a data structure is recovered. For example, if the computing system 105 is a source environment from which a data structure is recovered (e.g., in response to a user request, that fails based on a disaster event), the DMS 110 may recover the data structure of the computing system 105 to another destination computing system 105, for example, using snapshots 135 of virtual machines of the data structure. If the computing system 105 is a destination environment, the DMS 110 may recover the data structure to the computing system 105 from a second computing system 105.

In accordance with examples described herein, the DMS 110 may support data structure recovery that reduces or eliminates user error and saves user time, among other benefits. For example, in response to a request to recover a data structure, the DMS 110 may use metadata indicative of a topology of the data structure to determine how to recover virtual machines of the data structure to a destination environment. For instance, the DMS 110 may use the metadata to determine destination resources of the destination environment to which to recover the virtual machines of the data structure, the destination resources having a topology that is the same as or based on the topology of the data structure, and may recover the virtual machines to destination resources of the destination environment. In this way, manual virtual machine selection by the user for recovery may be avoided in association with recovering the data structure and may be replaced with automatic selection by the DMS 110, thereby reducing recovery errors and saving the user time, among other benefits.

Figure 2:
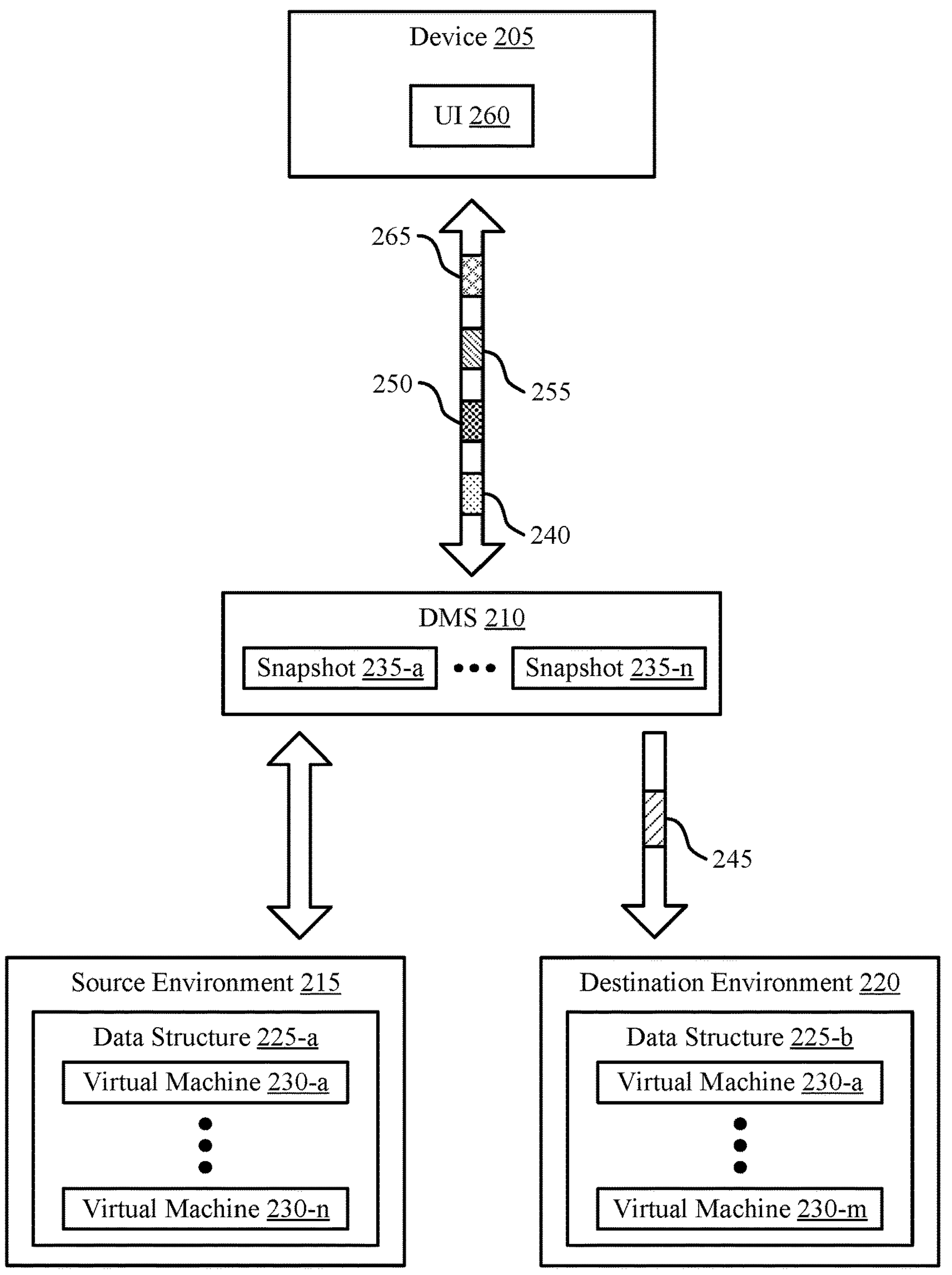

FIG. 2 illustrates an example of a computing environment 200 that supports disaster recovery techniques in accordance with aspects of the present disclosure. The computing environment 200 may implement or be implemented by aspects of the computing environment 100 described with reference to FIG. 1. For example, the computing environment 200 may include a device 205 and a DMS 210, which may be examples of a computing device 115 and a DMS 110 described with reference to FIG. 1, respectively. The computing environment 200 may also include various environments, which may be examples of one or more aspects of a computing system 105 described with reference to FIG. 1.

For example, the computing environment 200 may include a source environment 215, which may be an example of an environment used to host (e.g., store, support) one or more data structures 225, such as a cloud environment, a computing system 105, a server 125, a private data store, or an on-prem data center, among other types of environments. The computing environment 200 may include a destination environment, which may be an example of an environment to which the one or more data structures 225 (e.g., virtual machines 230 of the one or more data structures 225) may be recovered.

In the example of FIG. 2, the source environment 215 may include a data structure 225-*a*. In some examples, the data structure 225-*a* may be a computing structure (e.g., a software structure) that hosts (e.g., manages, includes) multiple logical layers of virtual machines 230. For example, the data structure 225-*a* may include virtual machines 230-*a* through 230-*n* that are organized within various resources of the source environment 215 according to a first topology, as described with reference to FIG. 3, where different resources may be associated with different logical layers of the data structure 225-*a*.

The DMS 210 may manage the recovery (e.g., restoration) of the data structure 225-*a* (e.g., virtual machines 230 of the data structure 225-*a*) to the destination environment 220. For example, the DMS 210 may receive a request 240 from the device 205 (e.g., a user associated with the source environment 215) to recover the data structure 225-*a* (e.g., recover the virtual machines 230 of the data structure 225-*a*) to the destination environment 220. In some examples, the DMS 210 may receive the request 240 based on a failure event associated with the source environment 215. For example, the source environment 215 may be subject to a ransomware attack, a disaster (e.g., a natural disaster at or near a geographic location where the source environment 215 is hosted), or a power outage, among other types of failure events that cause the source environment 215 to fail. Failure of the source environment 215 may render the virtual machines 230 inoperable or otherwise inaccessible such that the one or more applications supported by the virtual machines 230 may be unsupported, and thus the device 205 may transmit the request 240 to the DMS 210.

The DMS 210 may support improved recovery techniques in association with recovering the data structure 225-*a* by supporting automatic selection of virtual machines 230 for recovery. For example, the DMS 210 may provide backup services to the source environment 215, as described with reference to FIG. 1. As part of the backup services, the DMS 210 may capture and store snapshots 235 of the virtual machines 230. For example, the DMS 210 may manage the (e.g., periodic) capture and storage of snapshots 235-*a* through 235-*n* of the virtual machines 230-*a* through 230-*n* and may use the snapshots 235 to recover (e.g., instantiate) corresponding virtual machines 230 to, for example, the destination environment 220.

As part of the capture and storage of snapshot 235, the DMS 210 may ingest (e.g., capture, generate, store) metadata associated with the data structure 225-*a*. For example, the DMS 210 may ingest metadata that indicates the first topology according to which the virtual machines 230) are organized within the data structure 225-*a* (e.g., the organization and relationship of the various logical layers and corresponding virtual machines 230), as described with reference to FIG. 3. Accordingly, in response to the request 240 to recover the data structure 225-*a* to the destination environment 220, the DMS 210 may access the metadata to determine the first topology of the data structure 225-*a*, and thus the virtual machines 230) that are associated with (e.g., included in) the data structure 225-*a*. For instance, the DMS 210 may backup additional virtual machines 230 that are unassociated with the data structure 225-*a*, and thus should not be recovered to the destination environment 220) in response to the request 240. The DMS 210 may use the metadata to determine which virtual machines 230 backed up by the DMS 210 are to be recovered in response to the request 240) (e.g., the virtual machines 230-*a* through 230-*n*).

In addition to determining which virtual machines 230 are to be recovered in response to the request 240, the DMS 210 may determine how the virtual machines are to be recovered. That is, the DMS 210 may determine a set of destination resources of the destination environment to which to recover the virtual machines 230-*a* through 230-*n* such that a topology of the virtual machines 230-*a* through 230-*n* is the same as or based on the first topology of the data structure 225-*a* (e.g., or modified based on user request or differentiation between resources of the source environment 215 and resources of the destination environment 220). For example, the DMS 210 may recover virtual machines 230 of the data structure 225-*a* to resources of a data structure 225-*b* at the destination environment 220, where the data structure 225-*b* may be organized according to a second topology that is the same as or based on the first topology, as described with reference to FIGS. 3 and 4.

In some examples, the DMS 210 may determine that the destination environment 220 includes destination resources organized according to logical layers to which the DMS 210 may recover virtual machines 230. For example, the DMS 210 may determine that destination resources of the destination environment 220 (e.g., destination resources of the data structure 225-*b*) are organized according to the second topology and may use the organized destination resources for recovery of the virtual machines 230.

In some examples, the DMS 210 may determine that the destination environment 220 includes empty destination resources (e.g., unorganized destination resources). That is, the DMS 210 may determine that the destination environment 220 includes destination resources (e.g., the data structure 225-*b*) organized according to a third topology that excludes logical layers. Here, the DMS 210 may transmit resource signaling 245 that causes (e.g., instructs) the destination environment 220 to organize the destination resources according to the second topology such that the virtual machines 230 may be recovered while maintaining a same or similar topology of the virtual machines 230 at the source environment 215.

In some examples, the DMS 210 may provide, to a user associated with the source environment (e.g., a user of the device 205), a suggested recovery of the virtual machines 230 of the data structure 225-*a* to the destination environment 220. For example, the DMS 210 may select the virtual machines 230-*a* through 230-*n* for recovery in response to the request 240 based on the associated metadata. The DMS 210 may determine the set of destination resources to which to recover the selected virtual machines 230-*a* through 230-*n*. The DMS 210 may transmit a recovery indication 250 to the device 205 that indicates the selected virtual machines 230 for recovery, the determined destination resources for recovery of each selected virtual machine 230, or a combination thereof. In some examples, the device 205 may include a user interface 260 via which the DMS 210 may provide (e.g., present, display) the suggested recovery of the virtual machines 230.

The user may modify one or more aspects of the recovery. For example, the DMS 210 may receive a change request 255 from the device 205 (e.g., from the user via the device 205) that requests DMS 210 to deselect one or more of the virtual machines 230 for recovery (e.g., to deselect virtual machine 230-*n* and instead recover virtual machines 230-*a* through 230-*m*). Additionally, or alternatively, the DMS 210 may receive the change request 255 to recover one or more the virtual machines 230 to one or more different destination resources than those indicated via the recovery indication 250. The DMS 210 may update the recovery of the virtual machines 230 in response to the change request 255 and recovery the virtual machines 230 accordingly.

The DMS 210 may use the snapshots 235 to recover the virtual machines 230 to the destination environment 220. For example, the DMS 210 may identify snapshots 235 captured by the DMS 210 that correspond to the virtual machines 230 to be recovered to the destination environment 220. In some examples, the DMS 210 may use a respective most recently captured snapshot 235 to recover a corresponding virtual machine 230. For example, if the snapshot 235-*a* corresponds to a most recently captured and stored snapshot 235 in association with backing up the virtual machine 230-*a*, the DMS 210 may use the snapshot 235-*a* to recover the virtual machine 230-*a* to the destination environment 220. In some other examples, the DMS 210 may use a respective most recently captured snapshot 235 within a specified time window to recover a corresponding virtual machine 230. For example, the DMS 210 may receive a window indication 265 (e.g., from the device 205) indicating a time window within which the DMS 210 is to determine a most recently captured snapshot 235 for recovery of a corresponding virtual machines 230. In some examples, the time window may be an absolute time window (e.g., a particular day, a particular week, and the like) or a relative time window (e.g., snapshots 235 captured within the past week before the recovery of the virtual machines 230, snapshots 235 captured before 3 days ago, and the like).

In some examples, the DMS 210 may use one or more most recently captured snapshots 235 to recover a corresponding virtual machine 230, such as one or more most recently captured incremental snapshots and/or base snapshot to recover a most up to date version of the virtual machine 230 (e.g., most up to date version of the virtual machine 230) within the specified time window).

The DMS 210 facilitated virtual machine 230 selection and recovery may reduce user error and time associated with recovery of the data structure 225-*a*. For example, in response to the request 240, virtual machine 230 selection and recovery may be managed entirely by the DMS 210 using associated metadata that indicates the virtual machines 230 included in the data structure 225-*a* and the organization of the virtual machines 230 within the data structure 225-*a*. Additionally or alternatively, a user may modify aspects of a suggested recovery in which the DMS 210 selects and determines the virtual machines 230 and destination resources for recovery using the metadata, for example, rather than relying on the user to manually select the virtual machines 230 and destination resources.

Additionally, a latency associated with the recovery may be reduced. For example, to recover the virtual machines 230 to the DMS 210 may recover virtual machines 230 a logical layer at a time, for example, as part of a batch export of virtual machines 230) associated with the logical layer. Accordingly, the DMS 210 may perform at least one recovery operation per logical layer to recovery one or more corresponding virtual machines 230) to the destination environment 220. If the user manually selects the virtual machines 230 for recovery, the user, via the device 205, may transmit at least one recovery request per logical layer to the DMS 210 to recover corresponding virtual machines 230 manually selected by the user for each recovery request, which may be error prone and time intensive, especially as the quantity of virtual machines 230 increases. However, in accordance with the DMS 210 facilitated virtual machine 230 selection and recovery described herein, the DMS 210 may select and perform the recovery operations for the virtual machines 230 (e.g., subject to user input) in response to the single request 240, thereby reducing or eliminating user error and latency associated with communicating multiple recovery requests to recover the virtual machines 230. That is, the request 240 may be considered a "one-click" recovery of virtual machines 230 across multiple logical layers of a data structure 225.

Figure 3:
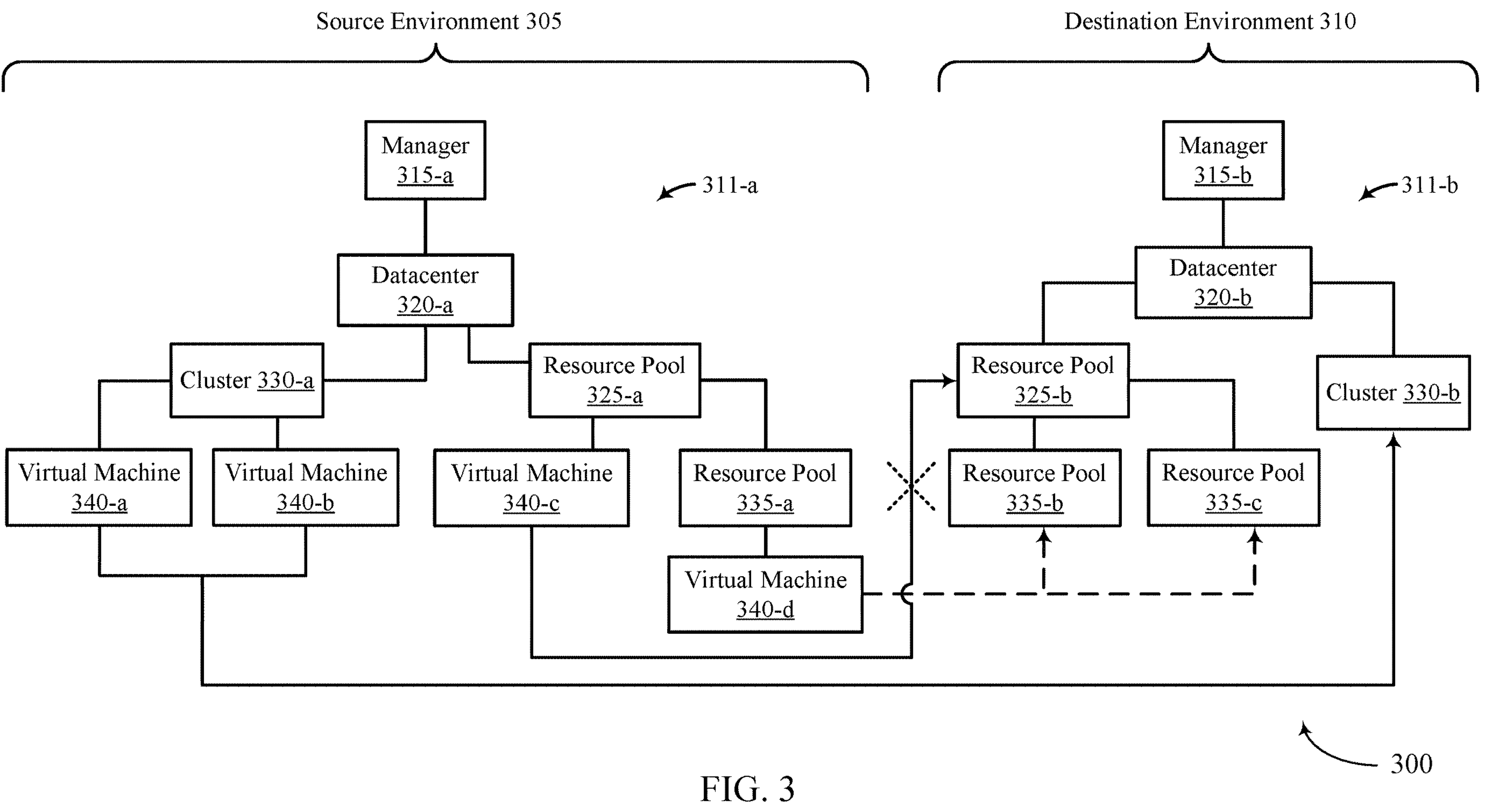
FIGS. 3 and 4 illustrate examples of recovery diagrams that support disaster recovery techniques in accordance with aspects of the present disclosure.

FIG. 3 illustrates an example of a recovery diagram 300 that supports disaster recovery techniques in accordance with aspects of the present disclosure. The recovery diagram 300 may be implemented by aspects of the computing environments 100 and 200, described with reference to FIGS. 1 and 2, respectively. For example, the recovery diagram 300 may be implemented by a DMS, which may be an example of a DMS described herein, including with reference to FIGS. 1 and 2.

The recovery diagram 300 shows a source environment 305 and a destination environment 310, which may be examples of the corresponding environments described herein, including with reference to FIGS. 1 and 2. The source environment 305 may include a data structure 311-*a*, which may be an example of a data structure described herein. For example, the data structure 311-*a* may include various resources (e.g., software entities, processors, memory) that may be used to support (e.g., manage, host) virtual machines 340 of the data structure 311-*a*. In the example of FIG. 3, the data structure 311-*a* may be an example of a centralized management server that provides a centralized platform for managing the virtual machines 340 of the data structure 311, such as a VMWare vCenter. For instance, in the example of FIG. 3, the data structure 311-*a* may include a manager 315-*a*, a datacenter 320-*a*, a cluster 330-*a*, a resource pool 325-*a*, and a resource pool 335-*a*, although other infrastructures including various quantities of these or other resources (e.g., hosts, such as ESX hosts, ESXi hosts, among other resources) are possible.

The manager 315-*a* may be a management server, such as vCenter server, that provides centralized monitoring and resource management software for the resources and virtual machines 340 of the data structure 311-*a*. The datacenter 320-*a* may be a virtual container for all the inventory objects used to complete a fully functional environment for operating the virtual machines 340. The cluster 330-*a* may be a group of hosts (e.g., host virtual machines), where a host may provide underlying hardware resources, such as processing power, memory, networking, and storage during virtualization. In some examples, a host may be an example of a hypervisor. In some examples, if a host is added to the cluster 330-*a*, the resources of the host become a part of the resources of the cluster 330-*a*, and the cluster 330-*a* may manage the resources of the hosts contained therein.

The resource pools 325-*a* and 335-*a* may be logical abstractions for flexible management of resources. For example, resource pools may be grouped into hierarchies and used to hierarchically partition available processor and memory resources. In some examples, a standalone host and/or a cluster 330 may have a respective root resource pool that groups the resources of that host or cluster. Child resource pools (e.g., a resource pool 335-*a*) of the root resource pool (e.g., a resource pool 325-*a*) or of any user-created child resource pool may be created. Each child resource pool owns some of the parent's resources and may, in turn, have a hierarchy of child resource pools to represent successively smaller units of computational capability. A resource pool may include child resource pools, virtual machines, or both. Hierarchies of shared resources may be created, where the resource pools at a higher level may be referred to as parent resource pools. Resource pools and virtual machines that are at the same level (e.g., same logical layer) are called siblings (e.g., the resource pool 335-*a* and a virtual machine 340-*a* may be siblings with respect to each other and children with respect to the resource pool 325-*a*). In some examples, a cluster 330 may itself represent a root resource pool.

Various resources of the data structure 311-*a* may be used to support various virtual machines 340. For instance, in the example of FIG. 3, a virtual machine 340-*a* and a virtual machine 340-*b* may be supported (e.g., hosted) by the cluster 330-*a* (e.g., one or more respective hosts of the cluster 330-*a*). The virtual machine 340-*c* may be supported by resources of the resource pool 325-*a*, and a virtual machine 340-*d* may be supported by resources of the resource pool 335-*a*. In some examples, virtual machines 340 supported by different resources may be considered to be at different logical layers of the data structure 311-*a*. For example, the virtual machines 340-*a* and 340-*b* may be a first logical layer, the virtual machine 340-*c* may be at a second logical layer, and the virtual machine 340-*d* may be a third logical layer of the data structure 311-*a*.

As part of a recovery of the virtual machines 340 to the destination environment 310, the DMS may determine a first topology of the data structure 311-*a*. That is, the DMS may identify the resources and virtual machines 340 of the data structure 311-*a* and the relations (e.g., hierarchical relations) between the resources and virtual machines 340. For example, as part of backing up the data structure 311-*a*, the DMS may ingest metadata that indicates the components of the data structure 311-*a* and the hierarchical relationships therein. For instance, the DMS may access the metadata to determine that the data structure 311-*a* include the manager 315-*a* that manages the datacenter 320-*a*. The DMS may further determine that the datacenter 320-*a* includes: the cluster 330-*a* and corresponding virtual machines 340, the resource pool 325-*a* and corresponding virtual machine 340-*c*: and the resource pool 335-*a* that is a child of the resource pool 325-*a* and is used to support the virtual machine 340-*d*. Additionally, the DMS may determine the various logical layers of the data structure 311-*a* and the corresponding resources and virtual machines 340 at each logical layer.

In some examples, the DMS may determine the first topology based on identifiers included in the metadata. For example, metadata may include an identifier of the manager 315-*a*, an identifier of the datacenter 320-*a*, an identifier of the cluster 330-*a*, an identifier of the resource pool 325-*a*, an identifier of the resource pool 335-*a*, and respective identifiers of the virtual machines 340. Additionally, metadata associated with the datacenter 320-*a* may include the identifier of the manager 315-*a* to indicate the relationship between the manager 315-*a* and the datacenter 320-*a*. Similarly, respective metadata associated with the cluster 330-*a* and the resource pool 325-*a* may include the identifiers of the manager 315-*a* and the datacenter 320-*a*, and metadata associated with the resource pool 335-*a* may include the identifiers of the manager 315-*a*, the datacenter 320-*a*, and the resource pool 325-*a*.

The DMS may determine a second topology for recovering the virtual machines 340) that is based on the first topology. For example, the DMS may determine a set of destination resources of the destination environment 310 that are organized according to a same topology as the first topology or a topology that is based on the first topology. For instance, the DMS may determine to recover the virtual machines 340-*a* and 340-*b* to a cluster 330-*b* of the destination environment 310 (e.g., a first logical layer), the virtual machine 340-*c* to a resource pool 325-*b* of the destination environment 310 (e.g., a second logical layer), and the virtual machine 340-*d* to a resource pool 335-*b* of the destination environment 310 (e.g., a third logical layer), where the cluster 330-*b* and the resource pools may be included in a datacenter 320-*b* managed by a manager 315-*b*.

In some examples, the DMS may determine an organization of destination resources of the destination environment 310. For example, the DMS may determine that the destination environment 310 includes a data structure 311-*b* including destination resources that are organized according to the second topology and may use the destination resources as organized for recovery. Alternatively, the DMS may determine that the destination resources are unorganized, such as organized according to a third topology excluding logical layers. For example, the DMS may determine that the data structure 311-*b* may include one or more of the manager 315-*b*, the datacenter 320-*b*, hosts, resource pools, and the like, but that these resources are not organized into respective logical layers and hierarchical relationships. Based on the determination, the DMS may cause the destination environment 310 to organize the data structure 311-*b* according to the second topology. For example, the DMS may cause the organize the resources into respective logical layers in accordance with the second topology such that the virtual machines 340 may be recovered in accordance with the second topology.

In some examples, one or more aspects of the recovery may be modified, for example, by a user associated with the environments. For example, the DMS may receive a request to deselect one or more of the virtual machines 340 from being recovered. In the example of FIG. 3, the DMS may receive a request to deselect the virtual machine 340-*c* for recovery, and the DMS may exclude the virtual machine 340-*c* from recovery to the destination environment 310 in response to the request. Additionally or alternatively, the DMS may receive a request to modify a destination resource for one or more of the virtual machines 340. For example, in the example of FIG. 3, the DMS may receive a request to recover the virtual machine 340-*d* to a different child resource pool 335 (e.g., a resource pool 335-*c*) of the resource pool 325, and the DMS may recover the virtual machine 340-*d* to the resource pool 335-*c* as part of the recovery of the virtual machines 340. Other destination resource modifications are possible, such as recovery to a different resource pool 325, a different host, or a different cluster 330, among other possibilities. Thus, in an example of FIG. 3, destination resources determined by the DMS for recovery may have a same topology as the resources of the source environment 305, and a topology of destination resources to which the virtual machines 340 are recovered may be modified relative to the destination resources determined by the DMS in response to one or more requests.

Figure 4:
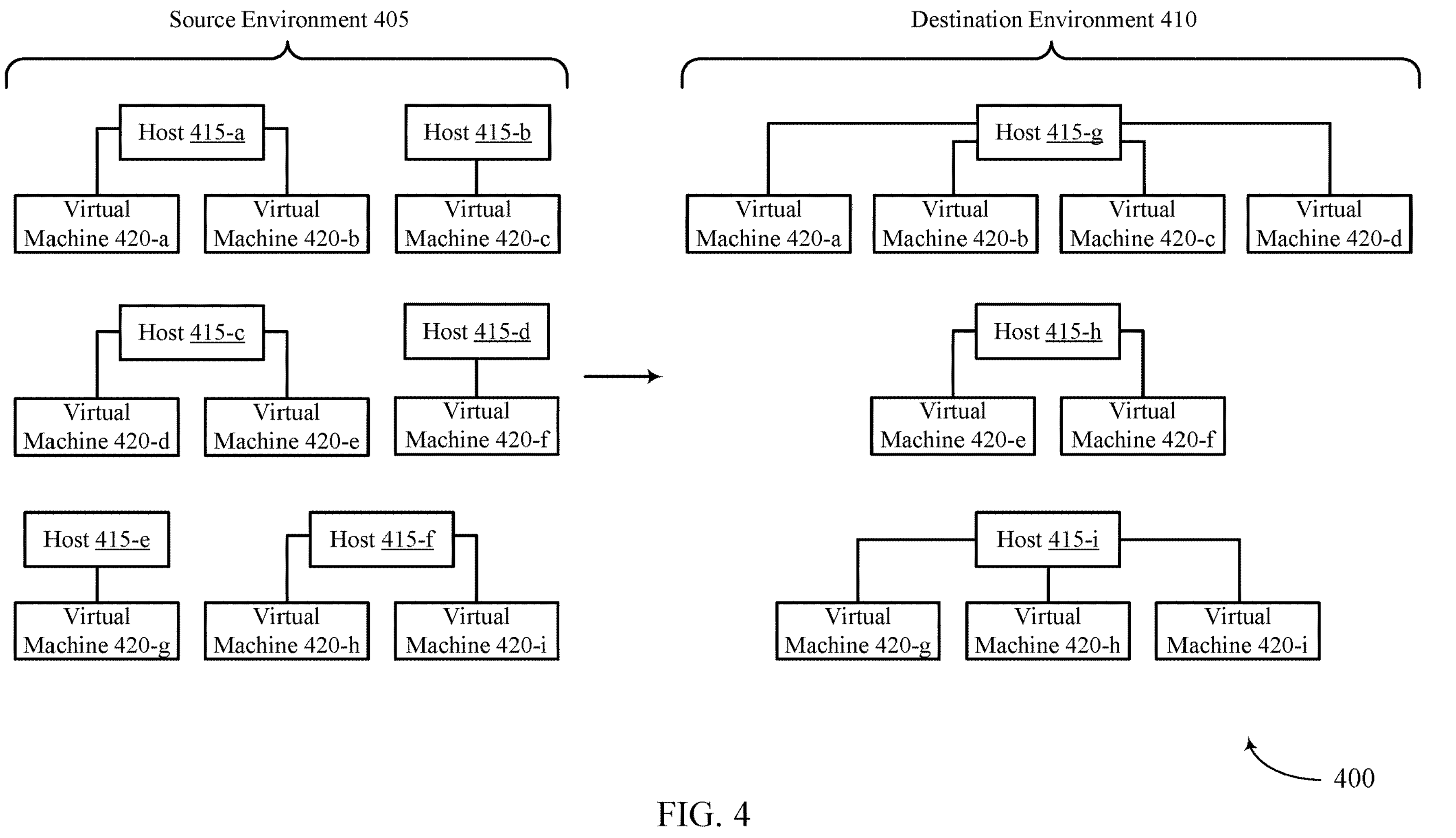

FIG. 4 illustrates an example of a recovery diagram 400 that supports disaster recovery techniques in accordance with aspects of the present disclosure. The recovery diagram 400 may be implemented by aspects of the computing environments 100 and 200, described with reference to FIGS. 1 and 2, respectively. For example, the recovery diagram 400 may be implemented by a DMS, which may be an example of a DMS described herein, including with reference to FIGS. 1 through 3.

The recovery diagram 400 may show a source environment 405 and a destination environment 410, which may be examples of the corresponding environments described herein, including with reference to FIGS. 1 through 3. The DMS may support the recovery of virtual machines 420 hosted by the source environment 405 to the destination environment 410, as described herein. In some examples, the destination environment 410 may include fewer resources available to support the virtual machines 420 than the source environment 405 (e.g., to reduce costs associated with the destination environment 410, among other reasons). For example, in the example of FIG. 4, the source environment 405 may include six hosts 415, hosts 415-*a*, 415-*b*, 415-*c*, 415-*d*, 415-*e*, and 415-*f*. The host 415-*a* may support a virtual machine 420-*a* and a virtual machine 420-*b*; the host 415-*b* may support a virtual machine 420-*c*: the host 415-*c* may support a virtual machine 420-*d* and a virtual machine 420-*e*; the host 415-*d* may support a virtual machine 420-*f*: the host 415-*e* may support a virtual machine 420-*g*: and the host 415-*f* may support a virtual machine 420-*h* and a virtual machine 420-*i*. The destination environment 410 may include three hosts 415, hosts 415-*g*, 415-*h*, and 415-*i*. Accordingly, in recovering the virtual machines 420 to the destination environment 410, a topology of the destination resources may be different than a topology of the resources of the source environment 405 (e.g., source resources) due to a mismatch in available resources.

Despite the mismatch in available resources, the DMS may determine destination resources to which to recover the virtual machines 420. For example, the DMS may determine that a quantity of source resources used to host the virtual machines 420 is greater than a quantity of destination resources available for hosting the virtual machines 420. As a result, the DMS may distribute the virtual machines 420 for recovery among the hosts 415 of the destination environment 410, which may be referred to as destination hosts 415. For example, the DMS may recover the virtual machines 420-*a*, 420-*b*, 420-*c*, and 420-*d* to the host 415-*g*: the virtual machines 420-*e* and 420-*f* to the host 415-*h*: and the virtual machines 420-*g*, 420-*h*, and 420-*i* to the host 415-*i*. Thus, a topology of the destination resources and virtual machines 420 at the destination environment 410 may be different than a topology of the source resources and virtual machines 420 at the source environment 405 due to the source environment 405 have more available resources than the destination environment 410.

The DMS may distribute the virtual machines 420 for recovery among the destination hosts 415 based on the resources (e.g., processing and memory resources) used by each virtual machine 420. For example, the DMS may distribute the virtual machines 420 among the destination hosts 415 such that a respective total quantity of resources used by the virtual machines 420 supported by a respective destination host 415 are relatively equal across the destination hosts 415. For instance, the DMS may determine, for each virtual machine 420, a respective quantity of resources used by the virtual machine 420. Using the determined quantities of resources, the DMS may determine how to recover the virtual machines 420 to the destination hosts 415 such that a load across the destination hosts 415 is relatively equal or evenly distributed. For instance, in the example of FIG. 4, the DMS may determine that a first quantity of resources used by a combination of the virtual machines 420-*a*. 420-*b*, 420-*c*, and 420-*d* may be equal to or relatively close to a second quantity of resources used by a combination of the virtual machines 420-*e* and 420-*f*. The DMS may also determine that the first and second quantities of resources may be equal to or relatively close to a third quantity of resources used by a combination of the virtual machines 420-*g*. 420-*h*, and 420-*i*. Accordingly, to evenly distribute the load of the virtual machines 420 across the destination hosts, the DMS may recover the virtual machines 420 to the destination hosts 415 as described based on the determination of the first, second, and third quantities of resources.

Figure 5:
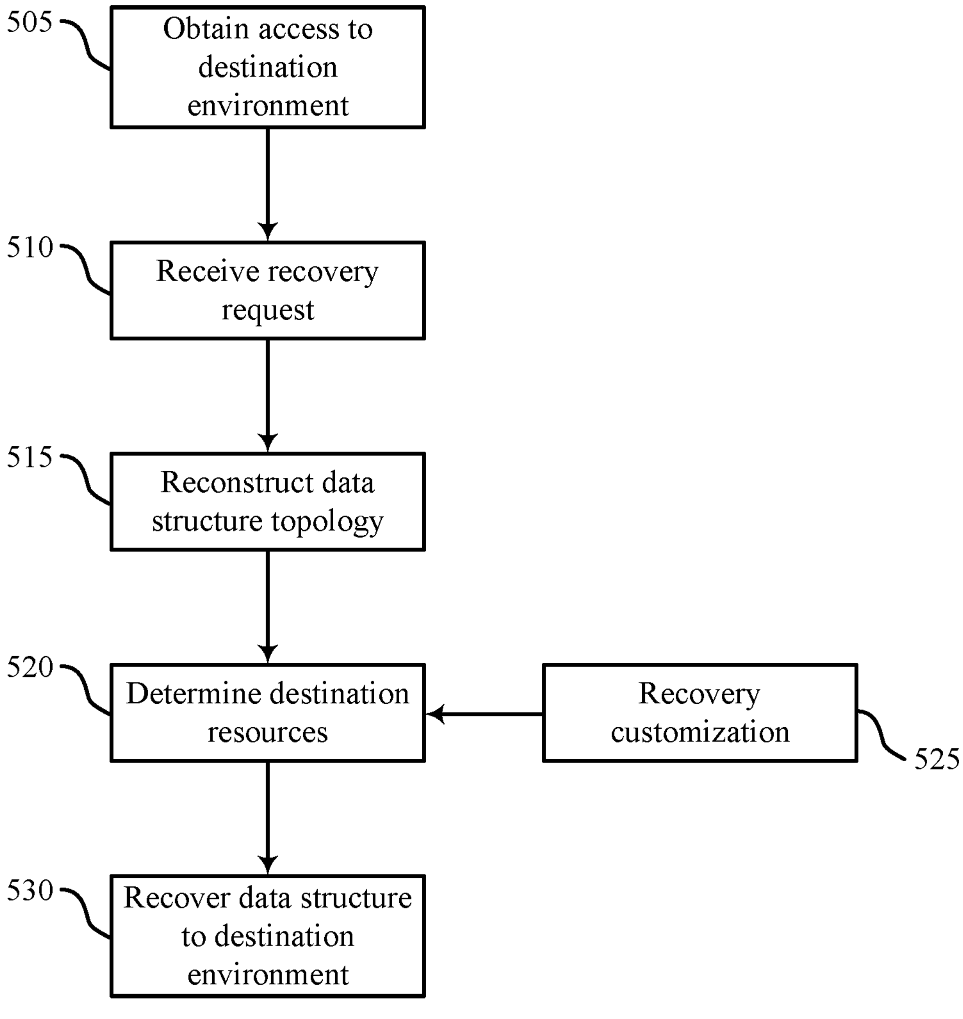
FIG. 5 illustrates an example of a process flow that supports disaster recovery techniques in accordance with aspects of the present disclosure.

FIG. 5 illustrates an example of a process flow 500 that supports disaster recovery techniques in accordance with aspects of the present disclosure. The process flow 500 may implement or be implemented by aspects of the computing environments described with reference to FIGS. 1 and 2. For example, the process flow 500 may be implemented by a DMS, which may be an example of a DMS described herein, including with reference to FIGS. 1 through 4 and 6 through 8. In the following description of the process flow 500, the operations performed by the DMS may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 505, the DMS may obtain access to a destination environment. For example, the DMS may be granted access by a user of the destination environment to access resources of the destination environment such that the DMS may recover computing objects, such as virtual machines, to the destination environment. In some examples, the DMS may receive permission (e.g., authorization, access) to modify resources of the destination environment. For example, if the destination environment is set up with an empty set of destination resources (e.g., unorganized destination resources), the DMS may be able to organize the destination resources according to a desired topology for recovery.

At 510, the DMS may receive a recovery request to recover the virtual machines of a data structure to the destination environment. For example, the DMS may backup the virtual machines of the data structure, for example, via the periodic capture and storage of snapshots corresponding to the virtual machines.

At 515, in response to the recovery request, the DMS may reconstruct a topology of the data structure. For example, the DMS may use metadata associated with the data structure to determine the various resources of the data structure and the organization of the virtual machines within the data structure, including respective logical layers of the virtual machines.

At 520, the DMS may determine destination resources to which to recover the virtual machines of the data structure. In some examples, the DMS may determine to recover the virtual machines to destination resources organized according to a same topology as the topology of the data structure. In some examples, the DMS may determine that the destination resources are organized according to a topology having logical layers (e.g., a same or different topology of the data structure) and may determine the destination resources as organized for recovery of the virtual machines. In some examples, the DMS may determine that the destination resources exclude organization according to logical layers (e.g., are empty destination resources). In some cases, the DMS may cause (e.g., transmit signaling to the destination environment to instruct) the destination environment to organize the destination resources according to the topology of the data structure.

In some examples, the DMS may determine that a quantity of available destination resources is less than a quantity of source resources used to support the data structure (e.g., resources of a source environment). Here, the DMS may determine the destination resources for recovery of the virtual machines such that the virtual machines are distributed (e.g., evenly) among the available destination resources. In some examples, the DMS may cause the DMS to organize the destination resources according to a topology that is in accordance with the determined distribution of the virtual machines.

At 525, the DMS may receive input to customize the recovery of the virtual machines. For example, the DMS may receive (e.g., as input to a user interface 260) a request to deselect one or more virtual machines for recovery, to change one or more destination resources of one or more virtual machines for recovery, or a combination thereof. In response, the DMS may update the determined destination resources for recovery of the virtual machines in accordance with the request.

At 530, the DMS may recover the virtual machines of the data structure to the destination resources of the destination environment.

Figure 6:
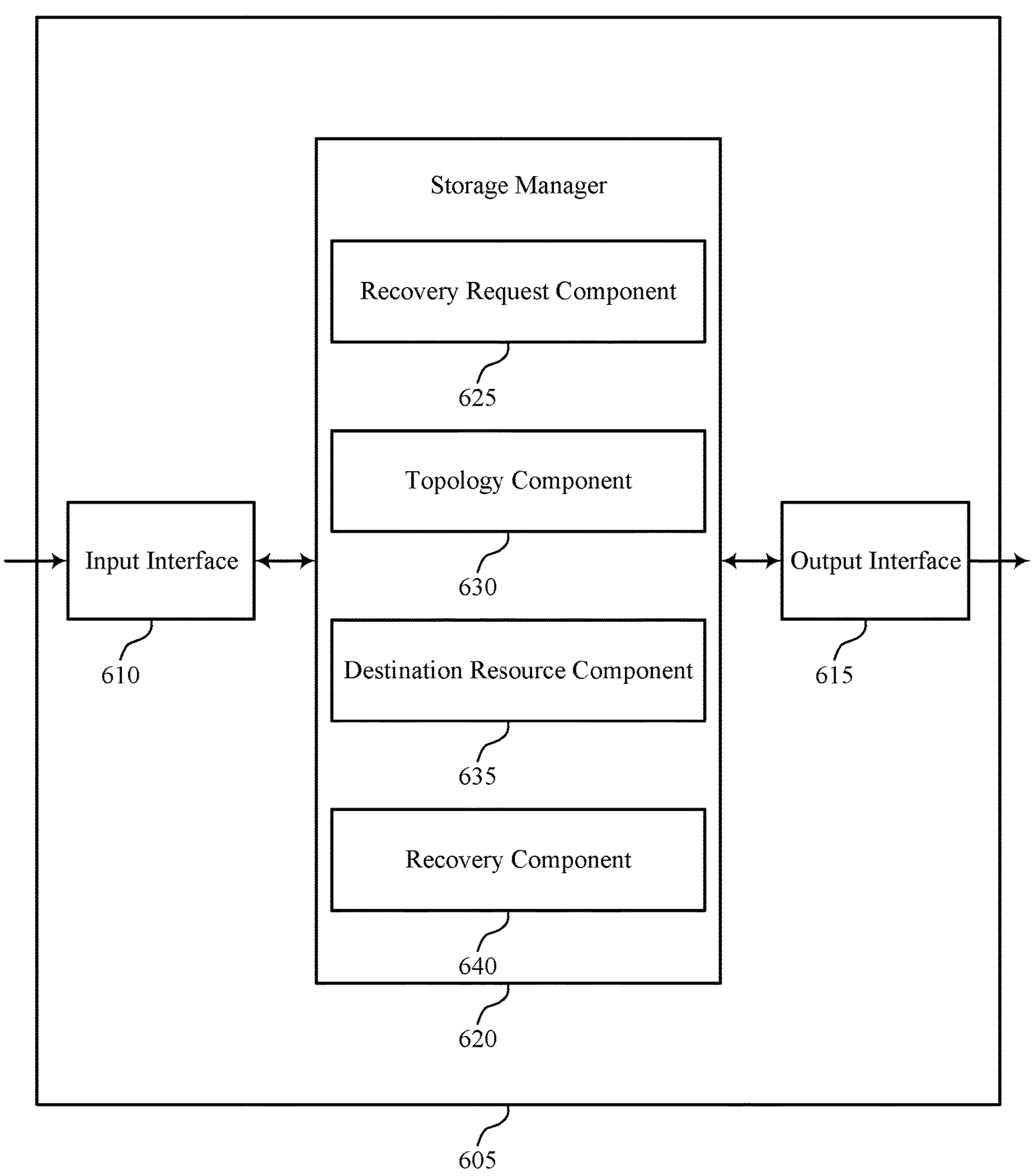
FIG. 6 illustrates a block diagram of an apparatus that supports disaster recovery techniques in accordance with aspects of the present disclosure.

FIG. 6 illustrates a block diagram 600 of a system 605 that supports disaster recovery techniques in accordance with aspects of the present disclosure. In some examples, the system 605 may be an example of aspects of one or more components described with reference to FIGS. 1 and 2, such as a DMS 110 or 210. The system 605 may include an input interface 610, an output interface 615, and a storage manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the storage manager 620 to support disaster recovery techniques. In some cases, the input interface 610 may be a component of a network interface 825 as described with reference to FIG. 8.

The output interface 615 may manage output signaling for the system 605. For example, the output interface 615 may receive signaling from other components of the system 605, such as the storage manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the storage manager 620 may include a recovery request component 625, a topology component 630, a destination resource component 635, a recovery component 640, or any combination thereof. In some examples, the storage manager 620, or various components thereof, may be configured to perform various operations (e.g., receiving, monitoring, transmitting) using or otherwise in cooperation with the input interface 610, the output interface 615, or both. For example, the storage manager 620 may receive information from the input interface 610, send information to the output interface 615, or be integrated in combination with the input interface 610, the output interface 615, or both to receive information, transmit information, or perform various other operations as described herein.

The storage manager 620 may support data management in accordance with examples as disclosed herein. The recovery request component 625 may be configured as or otherwise support a means for receiving, at a DMS (e.g., the system 605), a request to recover a data structure to a destination environment, the data structure including a set of multiple virtual machines that are backed up by the DMS and organized according to a first topology including a first set of multiple logical layers. The topology component 630 may be configured as or otherwise support a means for determining, by the DMS in response to the request, the first topology of the set of multiple virtual machines based on metadata associated with the data structure. The destination resource component 635 may be configured as or otherwise support a means for determining, by the DMS, a set of destination resources of the destination environment to which to recover the set of multiple virtual machines, the set of destination resources organized according to a second topology that is based on the first topology, the second topology including a second set of multiple logical layers. The recovery component 640 may be configured as or otherwise support a means for recovering the set of multiple virtual machines to the set of destination resources of the destination environment.

Figure 7:
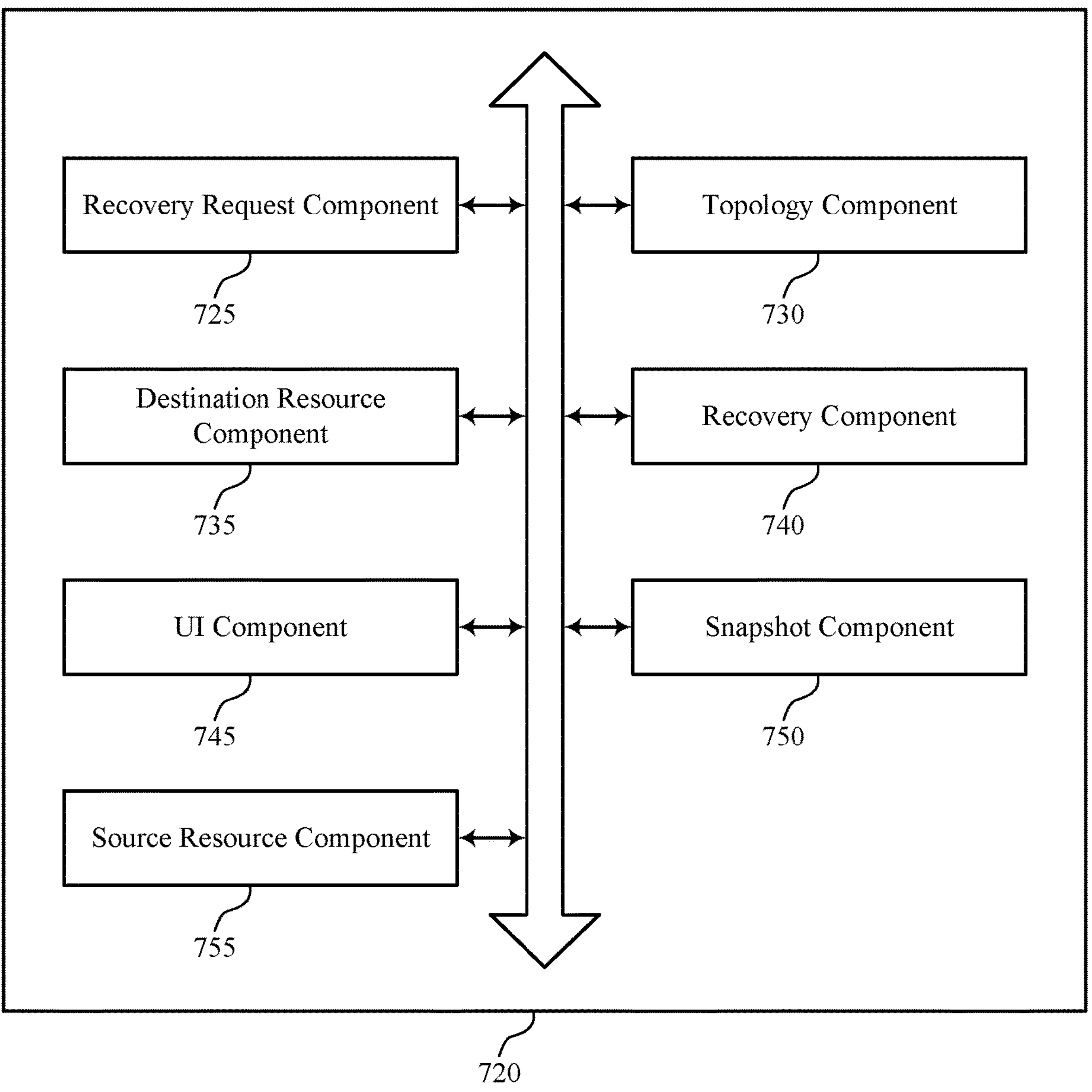
FIG. 7 illustrates a block diagram of a storage manager that supports disaster recovery techniques in accordance with aspects of the present disclosure.

FIG. 7 illustrates a block diagram 700 of a storage manager 720 that supports disaster recovery techniques in accordance with aspects of the present disclosure. The storage manager 720 may be an example of aspects of a storage manager or a storage manager 620, or both, as described herein. The storage manager 720, or various components thereof, may be an example of means for performing various aspects of disaster recovery techniques as described herein. For example, the storage manager 720) may include a recovery request component 725, a topology component 730, a destination resource component 735, a recovery component 740), a UI component 745, a snapshot component 750, a source resource component 755, or any combination thereof. Each of these components may communicate, directly or indirectly, with one another (e.g., via one or more buses, communications links, communications interfaces, or any combination thereof).

The storage manager 720 may support data management in accordance with examples as disclosed herein. The recovery request component 725 may be configured as or otherwise support a means for receiving, at a DMS, a request to recover a data structure to a destination environment, the data structure including a set of multiple virtual machines that are backed up by the DMS and organized according to a first topology including a first set of multiple logical layers. The topology component 730 may be configured as or otherwise support a means for determining, by the DMS in response to the request, the first topology of the set of multiple virtual machines based on metadata associated with the data structure. The destination resource component 735 may be configured as or otherwise support a means for determining, by the DMS, a set of destination resources of the destination environment to which to recover the set of multiple virtual machines, the set of destination resources organized according to a second topology that is based on the first topology, the second topology including a second set of multiple logical layers. The recovery component 740 may be configured as or otherwise support a means for recovering the set of multiple virtual machines to the set of destination resources of the destination environment.

In some examples, the destination resource component 735 may be configured as or otherwise support a means for determining, by the DMS, that destination resources of the destination environment are organized according to a third topology that excludes logical layers. In some examples, to determine the set of destination resources, the topology component 730 may be configured as or otherwise support a means for causing, based on determining that the destination resources of the destination environment are organized according to the third topology, the destination environment to organize the destination resources of the destination environment according to the second topology including the second set of multiple logical layers.

In some examples, the destination resource component 735 may be configured as or otherwise support a means for determining, by the DMS, that destination resources of the destination environment are organized according to the second topology including the second set of multiple logical layers, where the set of destination resources are determined based on the destination resources of the destination environment being organized according to the second topology.

In some examples, the destination resource component 735 may be configured as or otherwise support a means for determining, by the DMS, a second set of destination resources of the destination environment to which to recover the set of multiple virtual machines, the second set of destination resources organized according to a third topology that is based on the first topology and that includes a third set of multiple logical layers. In some examples, the recovery request component 725 may be configured as or otherwise support a means for receiving, at the DMS, a second request to recover one or more virtual machines of the set of multiple virtual machines to one or more destination resources of the destination environment different than corresponding destination resources of the second set of destination resources, where the set of destination resources are determined in accordance with the second request.

In some examples, the data structure includes a second set of multiple virtual machines including the set of multiple virtual machines, and the recovery request component 725 may be configured as or otherwise support a means for receiving, at the DMS, a second request to deselect one or more virtual machines of the second set of multiple virtual machines for recovery to the destination environment, where the one or more virtual machines are excluded from set of multiple virtual machines recovered to the destination environment based on the second request.

In some examples, the UI component 745 may be configured as or otherwise support a means for providing, via a user interface, a first indication of the set of multiple virtual machines to be recovered, a second indication of the set of destination resources, a third indication or the second topology, or any combination thereof.

In some examples, the destination resource component 735 may be configured as or otherwise support a means for determining that a first quantity of source resources associated with the set of multiple virtual machines is greater than a second quantity of the set of destination resources. In some examples, the destination resource component 735 may be configured as or otherwise support a means for distributing the set of multiple virtual machines for recovery among the set of destination resources based on the first quantity of source resources being greater than the second quantity of the set of destination resources.

In some examples, the source resource component 755 may be configured as or otherwise support a means for determining, for each virtual machine of the set of multiple virtual machines, a respective quantity of resources used by the virtual machine, where the set of multiple virtual machines are distributed for recovery among the set of destination resources based on the quantity of resources.

In some examples, the second topology is different than the first topology based on the first quantity of source resources being greater than the second quantity of the set of destination resources.

In some examples, to support recovering the set of multiple virtual machines, the snapshot component 750 may be configured as or otherwise support a means for identifying a set of snapshots captured by the DMS in association with backing up the set of multiple virtual machines. In some examples, to support recovering the set of multiple virtual machines, the recovery component 740 may be configured as or otherwise support a means for using a respective most recently captured snapshot to recover a corresponding virtual machine of the set of multiple virtual machines.

In some examples, the snapshot component 750 may be configured as or otherwise support a means for receiving, at the DMS, an indication of a time window associated with snapshots captured by the DMS in association with backing up the set of multiple virtual machines. In some examples, to recover the set of multiple virtual machines, the recovery component 740 may be configured as or otherwise support a means for using, based on the indication, a respective most recently captured snapshot within the time window to recover a corresponding virtual machine of the set of multiple virtual machines.

In some examples, to support recovering the set of multiple virtual machines, the recovery component 740 may be configured as or otherwise support a means for performing, in response to the request, one or more recovery operations per logical layer of the second set of multiple logical layers to recover one or more virtual machines of the set of multiple virtual machines associated with the logical layer.

Figure 8:
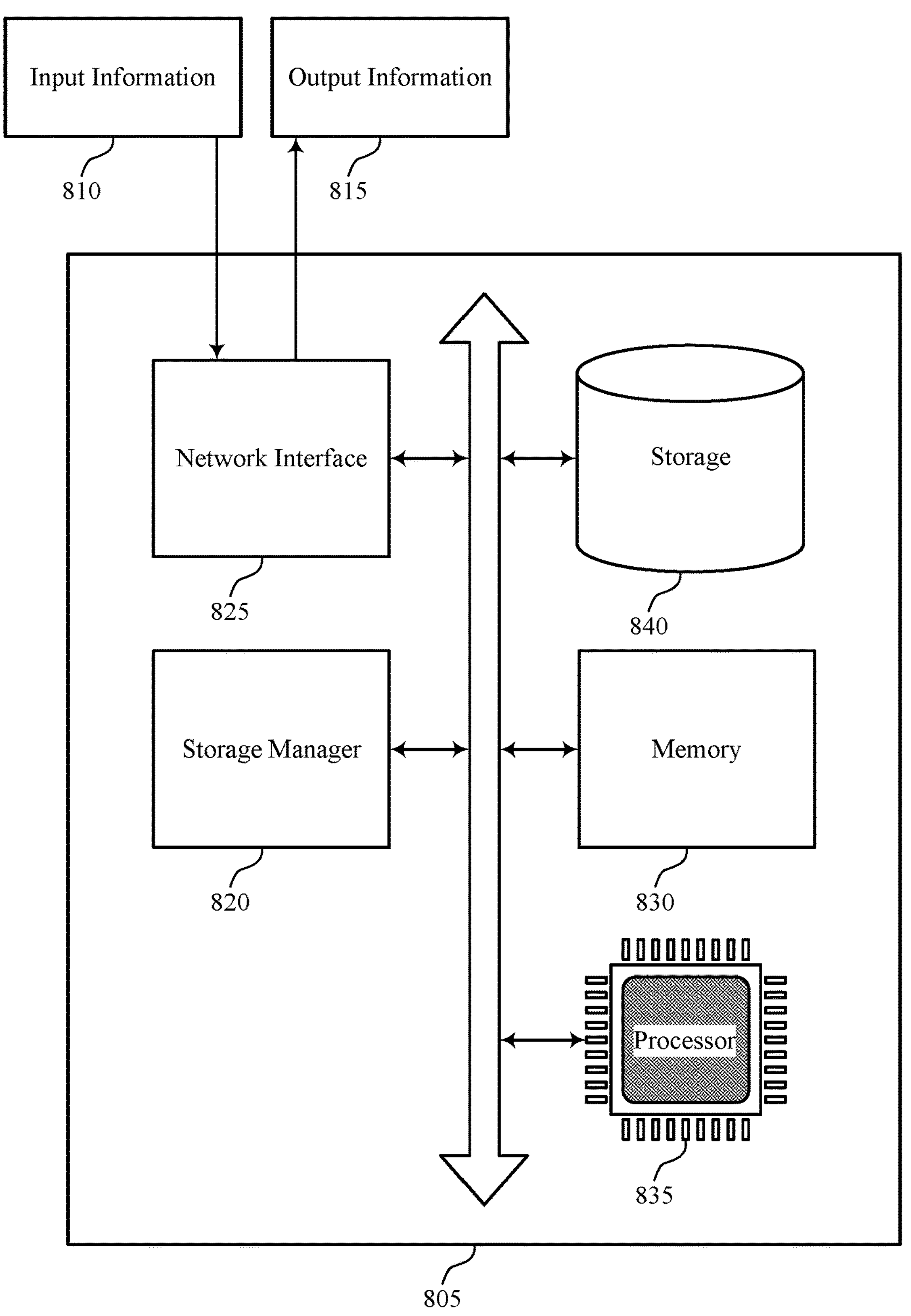
FIG. 8 illustrates a diagram of a system including a device that supports disaster recovery techniques in accordance with aspects of the present disclosure.

FIG. 8 illustrates a block diagram 800 of a system 805 that supports disaster recovery techniques in accordance with aspects of the present disclosure. The system 805 may be an example of or include the components of a system 605 as described herein. The system 805 may include components for data management, including components such as a storage manager 820, an input information 810, an output information 815, a network interface 825, a memory 830, a processor 835, and a storage 840. These components may be in electronic communication or otherwise coupled with each other (e.g., operatively, communicatively, functionally, electronically, electrically: via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting disaster recovery techniques). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840) may be configured to store data that is generated, processed, stored, or otherwise used by the system 805. In some cases, the storage 840 may include one or more HDDs, one or more SDDs, or both. In some examples, the storage 840) may be an example of a single database, a distributed database, multiple distributed databases, a data store, a data lake, or an emergency backup database. In some examples, the storage 840) may be an example of one or more components described with reference to FIG. 1, such as one or more network disks 180.

The storage manager 820 may support data management in accordance with examples as disclosed herein. For example, the storage manager 820 may be configured as or otherwise support a means for receiving, at a DMS (e.g., the system 805), a request to recover a data structure to a destination environment, the data structure including a set of multiple virtual machines that are backed up by the DMS and organized according to a first topology including a first set of multiple logical layers. The storage manager 820 may be configured as or otherwise support a means for determining, by the DMS in response to the request, the first topology of the set of multiple virtual machines based on metadata associated with the data structure. The storage manager 820 may be configured as or otherwise support a means for determining, by the DMS, a set of destination resources of the destination environment to which to recover the set of multiple virtual machines, the set of destination resources organized according to a second topology that is based on the first topology, the second topology including a second set of multiple logical layers. The storage manager 820 may be configured as or otherwise support a means for recovering the set of multiple virtual machines to the set of destination resources of the destination environment.

By including or configuring the storage manager 820 in accordance with examples as described herein, the system 805 may support techniques for disaster recovery techniques, which may provide one or more benefits such as, for example, reduced errors associated with data structure recovery, reduced latency associated with data structure recovery, automated selection of virtual machines for recovery by the system 805, and improved user experience as a result time savings and error reduction in association with data structure recovery, among other possibilities.

Figure 9:
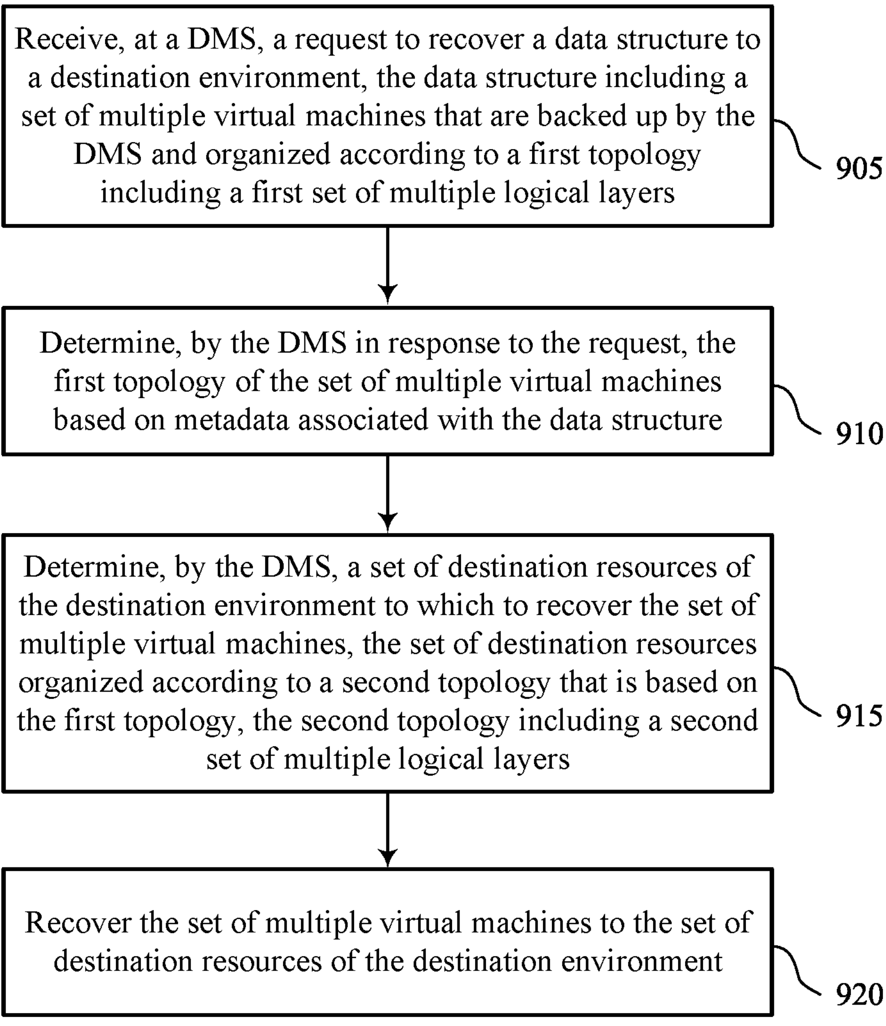
FIGS. 9 through 11 illustrate flowcharts showing methods that support disaster recovery techniques in accordance with aspects of the present disclosure.

FIG. 9 illustrates a flowchart showing a method 900 that supports disaster recovery techniques in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include receiving, at the DMS, a request to recover a data structure to a destination environment, the data structure including a set of multiple virtual machines that are backed up by the DMS and organized according to a first topology including a first set of multiple logical layers. The operations of 905 may be performed in accordance with examples as disclosed herein. In some examples, aspects of the operations of 905 may be performed by a recovery request component 725 as described with reference to FIG. 7.

At 910, the method may include determining, by the DMS in response to the request, the first topology of the set of multiple virtual machines based on metadata associated with the data structure. The operations of 910 may be performed in accordance with examples as disclosed herein. In some examples, aspects of the operations of 910 may be performed by a topology component 730 as described with reference to FIG. 7.

At 915, the method may include determining, by the DMS, a set of destination resources of the destination environment to which to recover the set of multiple virtual machines, the set of destination resources organized according to a second topology that is based on the first topology, the second topology including a second set of multiple logical layers. The operations of 915 may be performed in accordance with examples as disclosed herein. In some examples, aspects of the operations of 915 may be performed by a destination resource component 735 as described with reference to FIG. 7.

At 920, the method may include recovering the set of multiple virtual machines to the set of destination resources of the destination environment. The operations of 920 may be performed in accordance with examples as disclosed herein. In some examples, aspects of the operations of 920 may be performed by a recovery component 740 as described with reference to FIG. 7.

Figure 10:
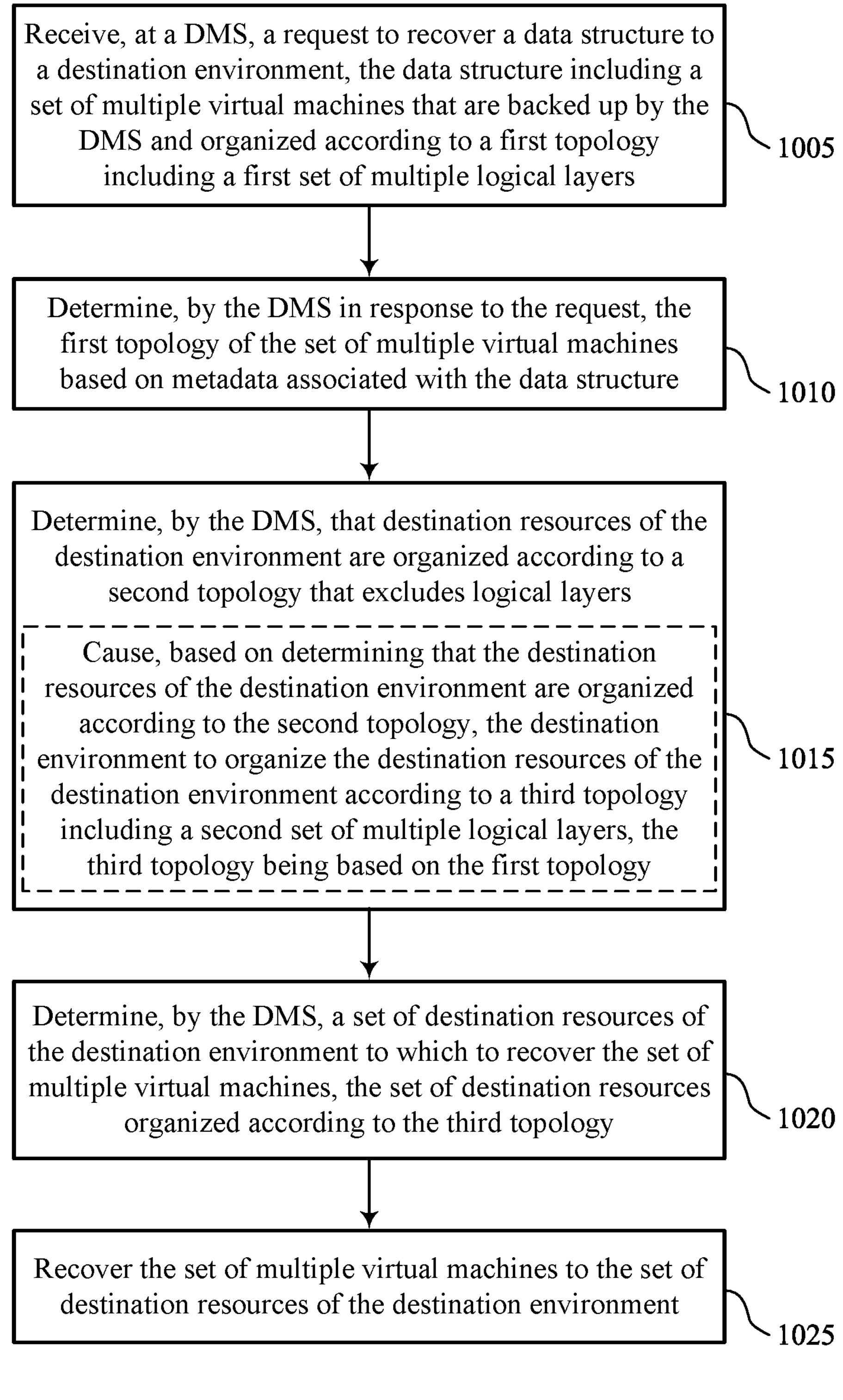

FIG. 10 illustrates a flowchart showing a method 1000 that supports disaster recovery techniques in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at the DMS, a request to recover a data structure to a destination environment, the data structure including a set of multiple virtual machines that are backed up by the DMS and organized according to a first topology including a first set of multiple logical layers. The operations of 1005 may be performed in accordance with examples as disclosed herein. In some examples, aspects of the operations of 1005 may be performed by a recovery request component 725 as described with reference to FIG. 7.

At 1010, the method may include determining, by the DMS in response to the request, the first topology of the set of multiple virtual machines based on metadata associated with the data structure. The operations of 1010 may be performed in accordance with examples as disclosed herein. In some examples, aspects of the operations of 1010 may be performed by a topology component 730 as described with reference to FIG. 7.

At 1015, the method may include determining, by the DMS, that destination resources of the destination environment are organized according to a second topology that excludes logical layers. In some examples, determining the set of destination resources may include causing, based on determining that the destination resources of the destination environment are organized according to the second topology, the destination environment to organize the destination resources of the destination environment according to a third topology including a second set of multiple logical layers, the third topology being based on the first topology. The operations of 1015 may be performed in accordance with examples as disclosed herein. In some examples, aspects of the operations of 1015 may be performed by a destination resource component 735 as described with reference to FIG. 7.

At 1020, the method may include determining, by the DMS, a set of destination resources of the destination environment to which to recover the set of multiple virtual machines, the set of destination resources organized according to the third topology. The operations of 1020 may be performed in accordance with examples as disclosed herein. In some examples, aspects of the operations of 1020 may be performed by a destination resource component 735 as described with reference to FIG. 7.

At 1025, the method may include recovering the set of multiple virtual machines to the set of destination resources of the destination environment. The operations of 1025 may be performed in accordance with examples as disclosed herein. In some examples, aspects of the operations of 1025 may be performed by a recovery component 740 as described with reference to FIG. 7.

Figure 11:
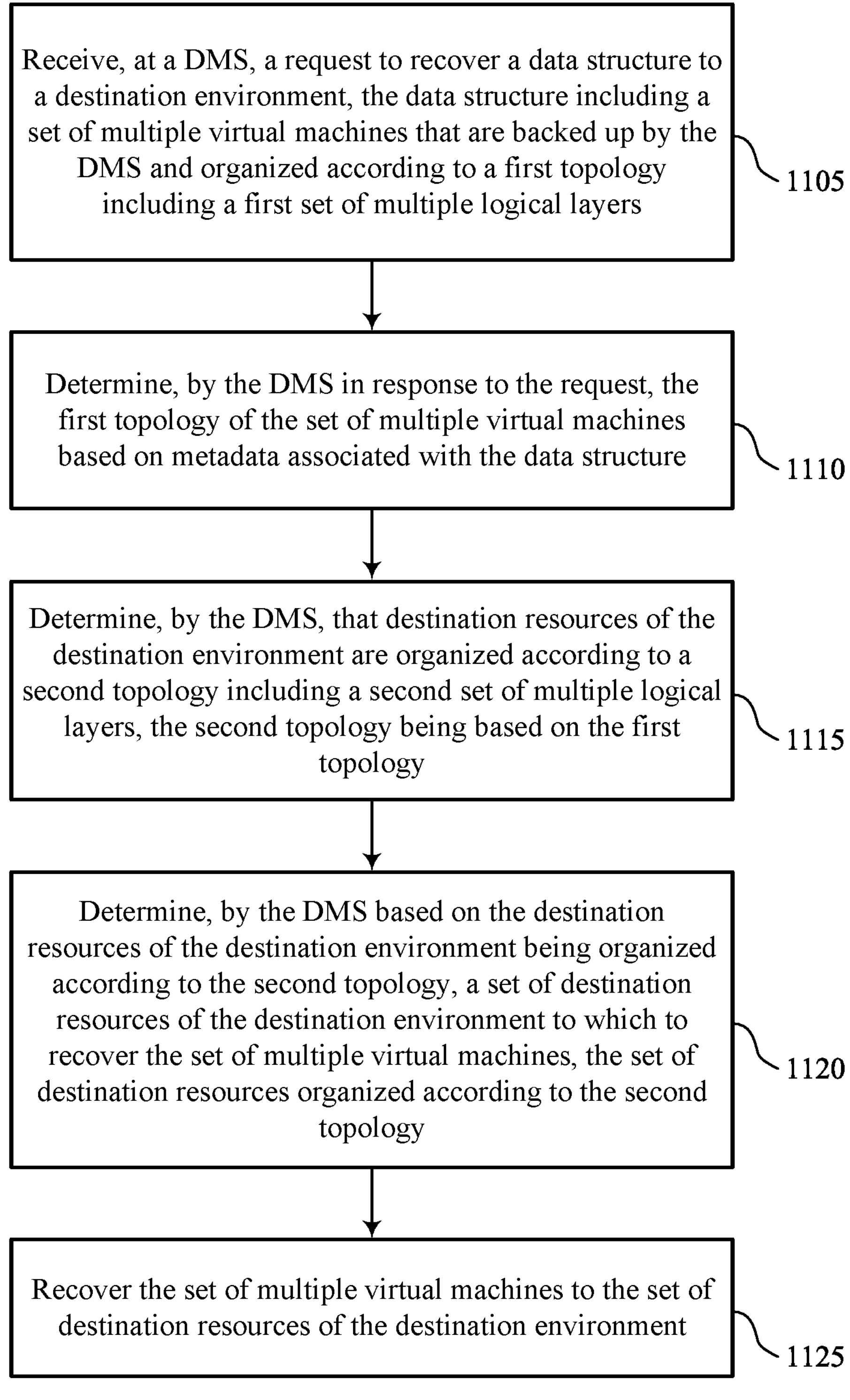

FIG. 11 illustrates a flowchart showing a method 1100 that supports disaster recovery techniques in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include receiving, at the DMS, a request to recover a data structure to a destination environment, the data structure including a set of multiple virtual machines that are backed up by the DMS and organized according to a first topology including a first set of multiple logical layers. The operations of 1105 may be performed in accordance with examples as disclosed herein. In some examples, aspects of the operations of 1105 may be performed by a recovery request component 725 as described with reference to FIG. 7.

At 1110, the method may include determining, by the DMS in response to the request, the first topology of the set of multiple virtual machines based on metadata associated with the data structure. The operations of 1110 may be performed in accordance with examples as disclosed herein. In some examples, aspects of the operations of 1110 may be performed by a topology component 730 as described with reference to FIG. 7.

At 1115, the method may include determining, by the DMS, that destination resources of the destination environment are organized according to a second topology including a second set of multiple logical layers, the second topology being based on the first topology. The operations of 1115 may be performed in accordance with examples as disclosed herein. In some examples, aspects of the operations of 1115 may be performed by a destination resource component 735 as described with reference to FIG. 7.

At 1120, the method may include determining, by the DMS based on the destination resources of the destination environment being organized according to the second topology, a set of destination resources of the destination environment to which to recover the set of multiple virtual machines, the set of destination resources organized according to the second topology. The operations of 1120 may be performed in accordance with examples as disclosed herein. In some examples, aspects of the operations of 1120 may be performed by a destination resource component 735 as described with reference to FIG. 7.

At 1125, the method may include recovering the set of multiple virtual machines to the set of destination resources of the destination environment. The operations of 1125 may be performed in accordance with examples as disclosed herein. In some examples, aspects of the operations of 1125 may be performed by a recovery component 740 as described with reference to FIG. 7.

A method for data management is described. The method may include receiving, at a DMS, a request to recover a data structure to a destination environment, the data structure including a set of multiple virtual machines that are backed up by the DMS and organized according to a first topology including a first set of multiple logical layers, determining, by the DMS in response to the request, the first topology of the set of multiple virtual machines based on metadata associated with the data structure, determining, by the DMS, a set of destination resources of the destination environment to which to recover the set of multiple virtual machines, the set of destination resources organized according to a second topology that is based on the first topology, the second topology including a second set of multiple logical layers, and recovering the set of multiple virtual machines to the set of destination resources of the destination environment.

An apparatus for data management is described. The apparatus may include at least one processor, memory coupled with the at least one processor, and instructions stored in the memory. The instructions may be executable by the at least one processor to cause the apparatus to receive, at a DMS, a request to recover a data structure to a destination environment, the data structure including a set of multiple virtual machines that are backed up by the DMS and organized according to a first topology including a first set of multiple logical layers, determine, by the DMS in response to the request, the first topology of the set of multiple virtual machines based on metadata associated with the data structure, determine, by the DMS, a set of destination resources of the destination environment to which to recover the set of multiple virtual machines, the set of destination resources organized according to a second topology that is based on the first topology, the second topology including a second set of multiple logical layers, and recover the set of multiple virtual machines to the set of destination resources of the destination environment.

Another apparatus for data management is described. The apparatus may include means for receiving, at a DMS, a request to recover a data structure to a destination environment, the data structure including a set of multiple virtual machines that are backed up by the DMS and organized according to a first topology including a first set of multiple logical layers, means for determining, by the DMS in response to the request, the first topology of the set of multiple virtual machines based on metadata associated with the data structure, means for determining, by the DMS, a set of destination resources of the destination environment to which to recover the set of multiple virtual machines, the set of destination resources organized according to a second topology that is based on the first topology, the second topology including a second set of multiple logical layers, and means for recovering the set of multiple virtual machines to the set of destination resources of the destination environment.

A non-transitory computer-readable medium storing code for data management is described. The code may include instructions executable by at least one processor to receive, at a DMS, a request to recover a data structure to a destination environment, the data structure including a set of multiple virtual machines that are backed up by the DMS and organized according to a first topology including a first set of multiple logical layers, determine, by the DMS in response to the request, the first topology of the set of multiple virtual machines based on metadata associated with the data structure, determine, by the DMS, a set of destination resources of the destination environment to which to recover the set of multiple virtual machines, the set of destination resources organized according to a second topology that is based on the first topology, the second topology including a second set of multiple logical layers, and recover the set of multiple virtual machines to the set of destination resources of the destination environment.

Some examples of the method, apparatuses, and non-transitory computer-readable medium described herein may further include operations, features, means, or instructions for determining, by the DMS, that destination resources of the destination environment may be organized according to a third topology that excludes logical layers, where determining the set of destination resources includes causing, based on determining that the destination resources of the destination environment may be organized according to the third topology, the destination environment to organize the destination resources of the destination environment according to the second topology including the second set of multiple logical layers.

Some examples of the method, apparatuses, and non-transitory computer-readable medium described herein may further include operations, features, means, or instructions for determining, by the DMS, that destination resources of the destination environment may be organized according to the second topology including the second set of multiple logical layers, where the set of destination resources may be determined based on the destination resources of the destination environment being organized according to the second topology.

Some examples of the method, apparatuses, and non-transitory computer-readable medium described herein may further include operations, features, means, or instructions for determining, by the DMS, a second set of destination resources of the destination environment to which to recover the set of multiple virtual machines, the second set of destination resources organized according to a third topology that may be based on the first topology and that includes a third set of multiple logical layers and receiving, at the DMS, a second request to recover one or more virtual machines of the set of multiple virtual machines to one or more destination resources of the destination environment different than corresponding destination resources of the second set of destination resources, where the set of destination resources may be determined in accordance with the second request.

In some examples of the method, apparatuses, and non-transitory computer-readable medium described herein, the data structure includes a second set of multiple virtual machines including the set of multiple virtual machines and the method, apparatuses, and non-transitory computer-readable medium may include further operations, features, means, or instructions for receiving, at the DMS, a second request to deselect one or more virtual machines of the second set of multiple virtual machines for recovery to the destination environment, where the one or more virtual machines may be excluded from set of multiple virtual machines recovered to the destination environment based on the second request.

In some examples of the method, apparatuses, and non-transitory computer-readable medium described herein, providing, via a user interface, a first indication of the set of multiple virtual machines to be recovered, a second indication of the set of destination resources, a third indication or the second topology, or any combination thereof.

Some examples of the method, apparatuses, and non-transitory computer-readable medium described herein may further include operations, features, means, or instructions for determining that a first quantity of source resources associated with the set of multiple virtual machines may be greater than a second quantity of the set of destination resources and distributing the set of multiple virtual machines for recovery among the set of destination resources based on the first quantity of source resources being greater than the second quantity of the set of destination resources.

Some examples of the method, apparatuses, and non-transitory computer-readable medium described herein may further include operations, features, means, or instructions for determining, for each virtual machine of the set of multiple virtual machines, a respective quantity of resources used by the virtual machine, where the set of multiple virtual machines may be distributed for recovery among the set of destination resources based on the quantity of resources.

In some examples of the method, apparatuses, and non-transitory computer-readable medium described herein, the second topology may be different than the first topology based on the first quantity of source resources being greater than the second quantity of the set of destination resources.

In some examples of the method, apparatuses, and non-transitory computer-readable medium described herein, recovering the set of multiple virtual machines may include operations, features, means, or instructions for identifying a set of snapshots captured by the DMS in association with backing up the set of multiple virtual machines and using a respective most recently captured snapshot to recover a corresponding virtual machine of the set of multiple virtual machines.

Some examples of the method, apparatuses, and non-transitory computer-readable medium described herein may further include operations, features, means, or instructions for receiving, at the DMS, an indication of a time window associated with snapshots captured by the DMS in association with backing up the set of multiple virtual machines, where recovering the set of multiple virtual machines includes using, based on the indication, a respective most recently captured snapshot within the time window to recover a corresponding virtual machine of the set of multiple virtual machines.

In some examples of the method, apparatuses, and non-transitory computer-readable medium described herein, recovering the set of multiple virtual machines may include operations, features, means, or instructions for performing, in response to the request, one or more recovery operations per logical layer of the second set of multiple logical layers to recover one or more virtual machines of the set of multiple virtual machines associated with the logical layer.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:

receiving, at a data management system via a user interface, a request to recover a data structure to a destination environment, the data structure comprising a plurality of virtual machines that are backed up by the data management system and organized according to a first topology comprising a first plurality of logical layers;

determining, by the data management system and in response to the received request, the first topology of the plurality of virtual machines based at least in part on metadata associated with the data structure;

determining, by the data management system, a set of destination resources of the destination environment to which to recover the plurality of virtual machines, the set of destination resources organized according to a second topology that is based at least in part on the first topology, the second topology comprising a second plurality of logical layers; and recovering the plurality of virtual machines to the set of destination resources of the destination environment, wherein recovering the plurality of virtual machines comprises:

identifying a set of snapshots captured by the data management system in association with backing up the plurality of virtual machines; and using a respective most recently captured snapshot to recover a corresponding virtual machine of the plurality of virtual machines.

2. The method of claim 1, further comprising:

determining, by the data management system, that destination resources of the destination environment are organized according to a third topology that excludes logical layers, wherein determining the set of destination resources comprises:

causing, based at least in part on determining that the destination resources of the destination environment are organized according to the third topology, the destination environment to organize the destination resources of the destination environment according to the second topology comprising the second plurality of logical layers.

3. The method of claim 1, further comprising:

determining, by the data management system, that destination resources of the destination environment are organized according to the second topology comprising the second plurality of logical layers, wherein the set of destination resources is determined based at least in part on the destination resources of the destination environment being organized according to the second topology.

4. The method of claim 1, further comprising:

determining, by the data management system prior to determining the set of destination resources of the destination environment to which to recover the plurality of virtual machines, an initial set of destination resources of the destination environment to which to recover the plurality of virtual machines, the initial set of destination resources organized according to a third topology that is based at least in part on the first topology and that comprises a third plurality of logical layers; and receiving, at the data management system, a second request to recover one or more virtual machines of the plurality of virtual machines to one or more destination resources of the destination environment different than corresponding destination resources of the initial set of destination resources, wherein the set of destination resources determined by the data management system is determined in accordance with the second request and comprise the one or more destination resources of the second request.

5. The method of claim 1, wherein the data structure comprises an initial plurality of virtual machines, the plurality of virtual machines included in the initial plurality of virtual machines, and the method further comprising:

receiving, at the data management system, a second request to deselect one or more virtual machines of the initial plurality of virtual machines for recovery to the destination environment, wherein the one or more virtual machines are excluded from the plurality of virtual machines recovered to the destination environment based at least in part on the second request.

6. The method of claim 1, further comprising:

providing, via the user interface, a first indication of the plurality of virtual machines to be recovered, a second indication of the set of destination resources, a third indication of the second topology, or any combination thereof.

7. The method of claim 1, further comprising:

determining that a first quantity of source resources associated with the plurality of virtual machines is greater than a second quantity of the set of destination resources; and distributing the plurality of virtual machines for recovery among the set of destination resources based at least in part on the first quantity of source resources being greater than the second quantity of the set of destination resources.

8. The method of claim 7, further comprising:

determining, for each virtual machine of the plurality of virtual machines, a respective quantity of resources used by the virtual machine, wherein the plurality of virtual machines is distributed for recovery among the set of destination resources based at least in part on the quantities of resources.

9. The method of claim 7, wherein the second topology is different than the first topology based at least in part on the first quantity of source resources being greater than the second quantity of the set of destination resources.

10. The method of claim 1, wherein recovering the plurality of virtual machines comprises:

performing, in response to the received request, one or more recovery operations per logical layer of the second plurality of logical layers to recover one or more virtual machines of the plurality of virtual machines associated with the logical layer.

11. A method for data management, further comprising:

receiving, at a data management system via a user interface, a request to recover a data structure to a destination environment, the data structure comprising a plurality of virtual machines that are backed up by the data management system and organized according to a first topology comprising a first plurality of logical layers;

receiving, at the data management system, an indication of a time window associated with snapshots captured by the data management system in association with backing up the plurality of virtual machines;

determining, by the data management system and in response to the received request, the first topology of the plurality of virtual machines based at least in part on metadata associated with the data structure;

determining, by the data management system, a set of destination resources of the destination environment to which to recover the plurality of virtual machines, the set of destination resources organized according to a second topology that is based at least in part on the first topology, the second topology comprising a second plurality of logical layers; and recovering the plurality of virtual machines to the set of destination resources of the destination environment, wherein recovering the plurality of virtual machines comprises:

using, based at least in part on the indication, a respective most recently captured snapshot within the time window to recover a corresponding virtual machine of the plurality of virtual machines.

12. An apparatus for data management, comprising:

at least one processor;

memory coupled with the at least one processor; and instructions stored in the memory and executable by the at least one processor to cause the apparatus to:

receive, at a data management system via a user interface, a request to recover a data structure to a destination environment, the data structure comprising a plurality of virtual machines that are backed up by the data management system and organized according to a first topology comprising a first plurality of logical layers;

receive, at the data management system, an indication of a time window associated with snapshots captured by the data management system in association with backing up the plurality of virtual machines;

determine, by the data management system and in response to the received request, the first topology of the plurality of virtual machines based at least in part on metadata associated with the data structure;

determine, by the data management system, a set of destination resources of the destination environment to which to recover the plurality of virtual machines, the set of destination resources organized according to a second topology that is based at least in part on the first topology, the second topology comprising a second plurality of logical layers; and recover the plurality of virtual machines to the set of destination resources of the destination environment, wherein, to recover the plurality of virtual machines, the instructions are executable by the at least one processor to cause the apparatus to:

use, based at least in part on the indication, a respective most recently captured snapshot within the time window to recover a corresponding virtual machine of the plurality of virtual machines.

13. An apparatus for data management, comprising:

at least one processor;

memory coupled with the at least one processor; and instructions stored in the memory and executable by the at least one processor to cause the apparatus to:

receive, at a data management system via a user interface, a request to recover a data structure to a destination environment, the data structure comprising a plurality of virtual machines that are backed up by the data management system and organized according to a first topology comprising a first plurality of logical layers;

determine, by the data management system and in response to the received request, the first topology of the plurality of virtual machines based at least in part on metadata associated with the data structure;

determine, by the data management system, a set of destination resources of the destination environment to which to recover the plurality of virtual machines, the set of destination resources organized according to a second topology that is based at least in part on the first topology, the second topology comprising a second plurality of logical layers; and recover the plurality of virtual machines to the set of destination resources of the destination environment, wherein, to recover the plurality of virtual machines, the instructions are executable by the at least one processor to cause the apparatus to:

identify a set of snapshots captured by the data management system in association with backing up the plurality of virtual machines; and use a respective most recently captured snapshot to recover a corresponding virtual machine of the plurality of virtual machines.

14. The apparatus of claim 13, wherein the instructions are further executable by the at least one processor to cause the apparatus to:

determine, by the data management system, that destination resources of the destination environment are organized according to a third topology that excludes logical layers, wherein the instructions to determine the set of destination resources are executable by the at least one processor to cause the apparatus to:

cause, based at least in part on determining that the destination resources of the destination environment are organized according to the third topology, the destination environment to organize the destination resources of the destination environment according to the second topology comprising the second plurality of logical layers.

15. The apparatus of claim 13, wherein the instructions are further executable by the at least one processor to cause the apparatus to:

determine, by the data management system, that destination resources of the destination environment are organized according to the second topology comprising the second plurality of logical layers, wherein the set of destination resources is determined based at least in part on the destination resources of the destination environment being organized according to the second topology.

16. The apparatus of claim 13, wherein the instructions are further executable by the at least one processor to cause the apparatus to:

determine, by the data management system prior to determining the set of destination resources of the destination environment to which to recover the plurality of virtual machines, an initial set of destination resources of the destination environment to which to recover the plurality of virtual machines, the initial set of destination resources organized according to a third topology that is based at least in part on the first topology and that comprises a third plurality of logical layers; and receive, at the data management system, a second request to recover one or more virtual machines of the plurality of virtual machines to one or more destination resources of the destination environment different than corresponding destination resources of the initial set of destination resources, wherein the set of destination resources determined by the data management system is determined in accordance with the second request and comprise the one or more destination resources of the second request.

17. The apparatus of claim 13, wherein the data structure comprises an initial plurality of virtual machines, the plurality of virtual machines is included in the initial plurality of virtual machines, and the instructions are further executable by the at least one processor to cause the apparatus to:

receive, at the data management system, a second request to deselect one or more virtual machines of the initial plurality of virtual machines for recovery to the destination environment, wherein the one or more virtual machines are excluded from the plurality of virtual machines recovered to the destination environment based at least in part on the second request.

18. The apparatus of claim 13, wherein the instructions are further executable by the at least one processor to cause the apparatus to:

determine that a first quantity of source resources associated with the plurality of virtual machines is greater than a second quantity of the set of destination resources; and distribute the plurality of virtual machines for recovery among the set of destination resources based at least in part on the first quantity of source resources being greater than the second quantity of the set of destination resources.

19. The apparatus of claim 18, wherein the second topology is different than the first topology based at least in part on the first quantity of source resources being greater than the second quantity of the set of destination resources.

20. A non-transitory computer-readable medium storing code for data management, the code comprising instructions executable by at least one processor to:

receive, at a data management system via a user interface, a request to recover a data structure to a destination environment, the data structure comprising a plurality of virtual machines that are backed up by the data management system and organized according to a first topology comprising a first plurality of logical layers;

determine, by the data management system and in response to the received request, the first topology of the plurality of virtual machines based at least in part on metadata associated with the data structure;

determine, by the data management system, a set of destination resources of the destination environment to which to recover the plurality of virtual machines, the set of destination resources organized according to a second topology that is based at least in part on the first topology, the second topology comprising a second plurality of logical layers; and recover the plurality of virtual machines to the set of destination resources of the destination environment, wherein, to recover the plurality of virtual machines, the instructions are executable by the at least one processor to:

identify a set of snapshots captured by the data management system in association with backing up the plurality of virtual machines; and use a respective most recently captured snapshot to recover a corresponding virtual machine of the plurality of virtual machines.

21. A non-transitory computer-readable medium storing code for data management, the code comprising instructions executable by at least one processor to:

receive, at a data management system via a user interface, a request to recover a data structure to a destination environment, the data structure comprising a plurality of virtual machines that are backed up by the data management system and organized according to a first topology comprising a first plurality of logical layers;

receive, at the data management system, an indication of a time window associated with snapshots captured by the data management system in association with backing up the plurality of virtual machines;

determine, by the data management system and in response to the received request, the first topology of the plurality of virtual machines based at least in part on metadata associated with the data structure;

determine, by the data management system, a set of destination resources of the destination environment to which to recover the plurality of virtual machines, the set of destination resources organized according to a second topology that is based at least in part on the first topology, the second topology comprising a second plurality of logical layers; and recover the plurality of virtual machines to the set of destination resources of the destination environment, wherein, to recover the plurality of virtual machines, the instructions are executable by the at least one processor to:

use, based at least in part on the indication, a respective most recently captured snapshot within the time window to recover a corresponding virtual machine of the plurality of virtual machines.

* * * * *